United States Patent
Kaur et al.

(10) Patent No.: US 12,271,914 B2
(45) Date of Patent: Apr. 8, 2025

(54) METHOD AND SYSTEM FOR UNDERSTANDING FINANCIAL DOCUMENTS

(71) Applicant: JPMorgan Chase Bank, N.A., New York, NY (US)

(72) Inventors: Simerjot Kaur, Jersey City, NJ (US); Charese Smiley, Bristol, WI (US); Joy Sain, Fairborn, OH (US); Suchetha Siddagangappa, Brooklyn, NY (US); Akshat Gupta, New York, NY (US); Sameena Shah, Scarsdale, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 191 days.

(21) Appl. No.: 17/647,356

(22) Filed: Jan. 7, 2022

(65) Prior Publication Data
US 2023/0237512 A1 Jul. 27, 2023

(51) Int. Cl.
*G06F 40/295* (2020.01)
*G06N 5/02* (2023.01)
*G06Q 30/0201* (2023.01)

(52) U.S. Cl.
CPC ....... *G06Q 30/0201* (2013.01); *G06F 40/295* (2020.01); *G06N 5/02* (2013.01)

(58) Field of Classification Search
CPC ..... G06Q 30/0201; G06F 40/295; G06N 5/02
See application file for complete search history.

(56) References Cited

U.S. PATENT DOCUMENTS

| | | | |
|---|---|---|---|
| 2006/0085469 A1* | 4/2006 | Pfeiffer | G06N 5/025 707/999.102 |
| 2019/0005029 A1* | 1/2019 | Mills | G06F 40/30 |
| 2019/0311271 A1* | 10/2019 | Li | G06F 40/40 |
| 2021/0174016 A1* | 6/2021 | Fox | G06N 3/044 |
| 2022/0067278 A1* | 3/2022 | Huang | G06F 40/258 |
| 2022/0156304 A1* | 5/2022 | Muthuswamy | G06F 16/254 |
| 2022/0318505 A1* | 10/2022 | Pouran Ben Veyseh | G06N 3/0455 |

(Continued)

OTHER PUBLICATIONS

Relation Extraction Using Distant Supervision: a Survey; Alisa Smirnova, Philippe Cudré-Mauroux; Mar. 2019 (Year: 2019).*

(Continued)

*Primary Examiner* — Deirdre D Hatcher
(74) *Attorney, Agent, or Firm* — Greenblum & Bernstein, P.L.C.

(57) ABSTRACT

A method and a system for automatically processing financial documents to generate knowledge graphs that convey information relating to entities of interest and relationships between those entities are provided. The method includes: receiving a document; extracting raw text included in the document; identifying, based on the extracted raw text, a set of entities that are named in the document; determining respective relationship information that corresponds to respective pairs of entities; constructing a knowledge graph that illustrates respective relationships among the respective pairs of entities; and outputting the knowledge graph. The determination of the respective relationship information may be performed by applying an artificial intelligence (AI) algorithm that is trained by using historical data that relates to the set of entities.

20 Claims, 10 Drawing Sheets

(56) References Cited

U.S. PATENT DOCUMENTS

2023/0022673 A1* 1/2023 Derzsy .................. G06N 5/022

OTHER PUBLICATIONS

Impact of Entity Graphs on Extracting Semantic Relations; Rashedur Rahman, Brigitte Grau, Sophie Rosset; Sep. 10, 2019 (Year: 2019).*
Tree Kernel-based Relation Extraction with Context-Sensitive Structured Parse Tree Information; GuoDong Zhou, Min Zhang, Dong Hong Ji, QiaoMing Zhu; 2007 (Year: 2007).*

* cited by examiner

METHOD AND SYSTEM FOR UNDERSTANDING FINANCIAL DOCUMENTS

BACKGROUND

1. Field of the Disclosure

This technology generally relates to methods and systems for processing financial documents, and more particularly to methods and systems for automatically processing financial documents to generate knowledge graphs that convey information relating to entities of interest and relationships between those entities.

2. Background Information

Large financial institutions have a need to process large numbers of financial documents, many of which are quite lengthy and contain large volumes of information. In this aspect, reviewing, understanding, and drawing inferences from these types of documents is a tedious task that typically requires a significant amount of manual labor and hence is costly and time consuming to such institutions. In addition, conventional methods for extracting relevant information from such documents do not generalize well to different ontologies and new and/or previously unknown entities and relationships therebetween.

Accordingly, there is a need for a mechanism for automatically processing financial documents in order to generate knowledge graphs that convey information relating to entities of interest and relationships between those entities that is contained within the documents.

SUMMARY

The present disclosure, through one or more of its various aspects, embodiments, and/or specific features or sub-components, provides, inter alia, various systems, servers, devices, methods, media, programs, and platforms for automatically processing financial documents to generate knowledge graphs that convey information relating to entities of interest and relationships between those entities.

According to an aspect of the present disclosure, a method for characterizing information contained in a financial document is provided. The method is implemented by at least one processor. The method includes: receiving, by the at least one processor, a document; extracting, by the at least one processor, raw text included in the document; identifying, by the at least one processor based on the extracted raw text, a plurality of entities that are named in the document; determining, by the at least one processor based on the extracted raw text, respective relationship information that corresponds to at least one pair of entities from among the plurality of entities; and outputting, by the at least one processor, a subset of the determined respective relationship information.

The method may further include constructing, by the least one processor based on the determined respective relationship information, a knowledge graph that illustrates respective relationships among each of the at least one pair of entities.

The method may further include displaying, via a graphical user interface (GUI), the constructed knowledge graph.

The plurality of entities may include at least one from among a name of a person, a name of an organization, a title, a location, an amount, an event, and a date.

The determining of the respective relationship information may include applying, to the plurality of entities, an artificial intelligence (AI) algorithm that is trained by using historical data that relates to at least one entity from among the plurality of entities.

The identifying of the plurality of entities may be performed by applying a Natural Language Processing (NLP) algorithm that uses a named entity recognition technique to classify the extracted raw text into at least one from among a plurality of predetermined categories.

The NLP algorithm may classify the extracted raw text by using at least one from among a spaCy library, a CoreNLP library, and a LexNLP library.

According to another exemplary embodiment, a computing apparatus for characterizing information contained in a financial document is provided. The computing apparatus includes a processor; a memory; a display; and a communication interface coupled to each of the processor, the memory, and the display. The processor is configured to: receive, via the communication interface, a document; extract raw text included in the document; identify, based on the extracted raw text, a plurality of entities that are named in the document; determine, based on the extracted raw text, respective relationship information that corresponds to at least one pair of entities from among the plurality of entities; and output a subset of the determined respective relationship information.

The processor may be further configured to construct, based on the determined respective relationship information, a knowledge graph that illustrates respective relationships among each of the at least one pair of entities.

The processor may be further configured to cause the display to display, via a graphical user interface (GUI), the constructed knowledge graph.

The plurality of entities may include at least one from among a name of a person, a name of an organization, a title, a location, an amount, an event, and a date.

The processor may be further configured to determine the respective relationship information by applying, to the plurality of entities, an artificial intelligence (AI) algorithm that is trained by using historical data that relates to at least one entity from among the plurality of entities.

The processor may be further configured to perform the identifying of the plurality of entities by applying a Natural Language Processing (NLP) algorithm that uses a named entity recognition technique to classify the extracted raw text into at least one from among a plurality of predetermined categories.

The NLP algorithm may classify the extracted raw text by using at least one from among a spaCy library, a CoreNLP library, and a LexNLP library.

According to yet another exemplary embodiment, a non-transitory computer readable storage medium storing instructions for characterizing information contained in a financial document is provided. The storage medium includes executable code which, when executed by a processor, causes the processor to: receive a document; extract raw text included in the document; identify, based on the extracted raw text, a plurality of entities that are named in the document; determine, based on the extracted raw text, respective relationship information that corresponds to at least one pair of entities from among the plurality of entities; and output a subset of the determined respective relationship information.

The executable code may be further configured to cause the processor to construct, based on the determined respective relationship information, a knowledge graph that illustrates respective relationships among each of the at least one pair of entities.

The executable code may be further configured to cause the processor to display, via a graphical user interface (GUI), the constructed knowledge graph.

The plurality of entities may include at least one from among a name of a person, a name of an organization, a title, a location, an amount, an event, and a date.

The executable code may be further configured to cause the processor to determine the respective relationship information by applying, to the plurality of entities, an artificial intelligence (AI) algorithm that is trained by using historical data that relates to at least one entity from among the plurality of entities.

The executable code may be further configured to cause the processor to perform the identifying of the plurality of entities applying a Natural Language Processing (NLP) algorithm that uses a named entity recognition technique to classify the extracted raw text into at least one from among a plurality of predetermined categories.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
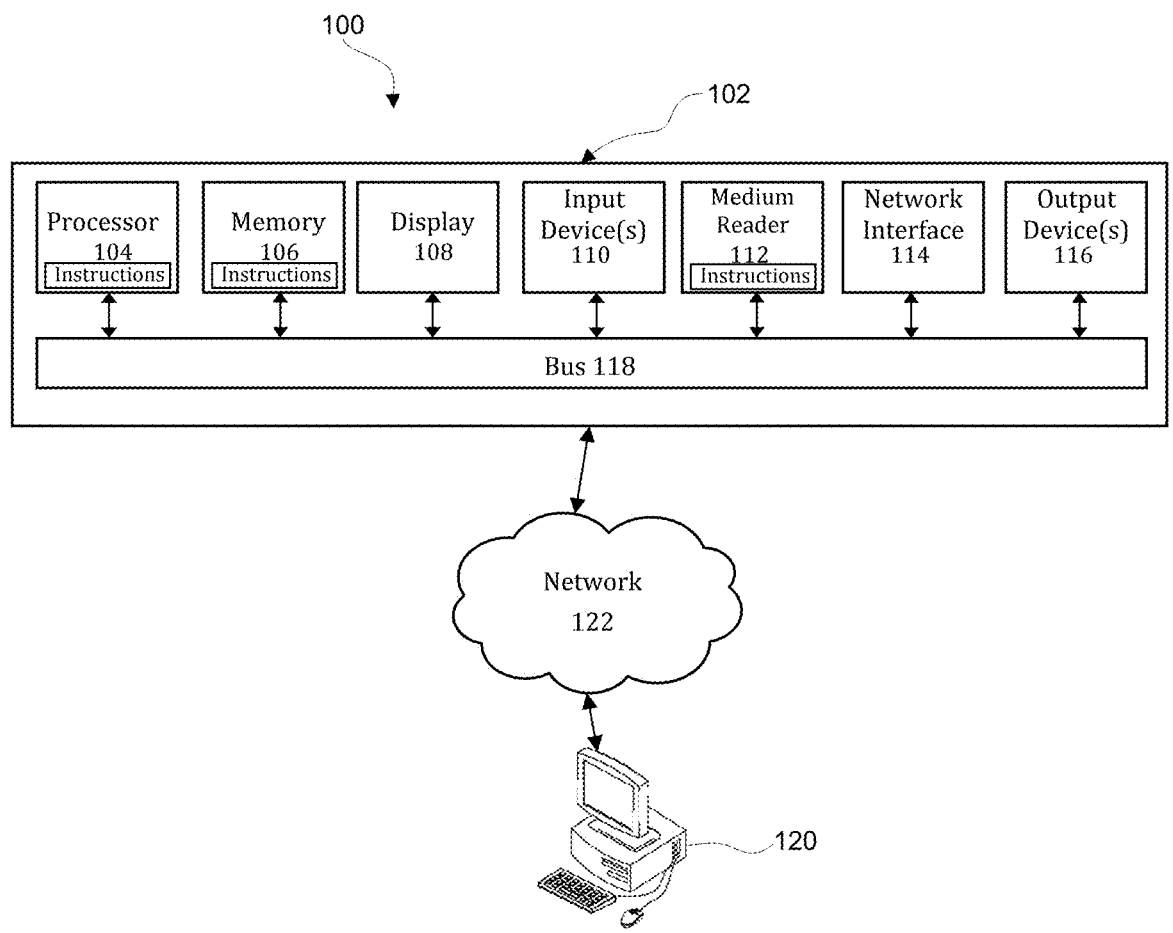
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data as well as executable instructions and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As illustrated in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is illustrated in FIG. 1 as a wireless network, those skilled in the art appreciate that the network 122 may also be a wired network.

The additional computer device 120 is illustrated in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for automatically processing financial documents to generate knowledge graphs that convey information relating to entities of interest and relationships between those entities.

Figure 2:
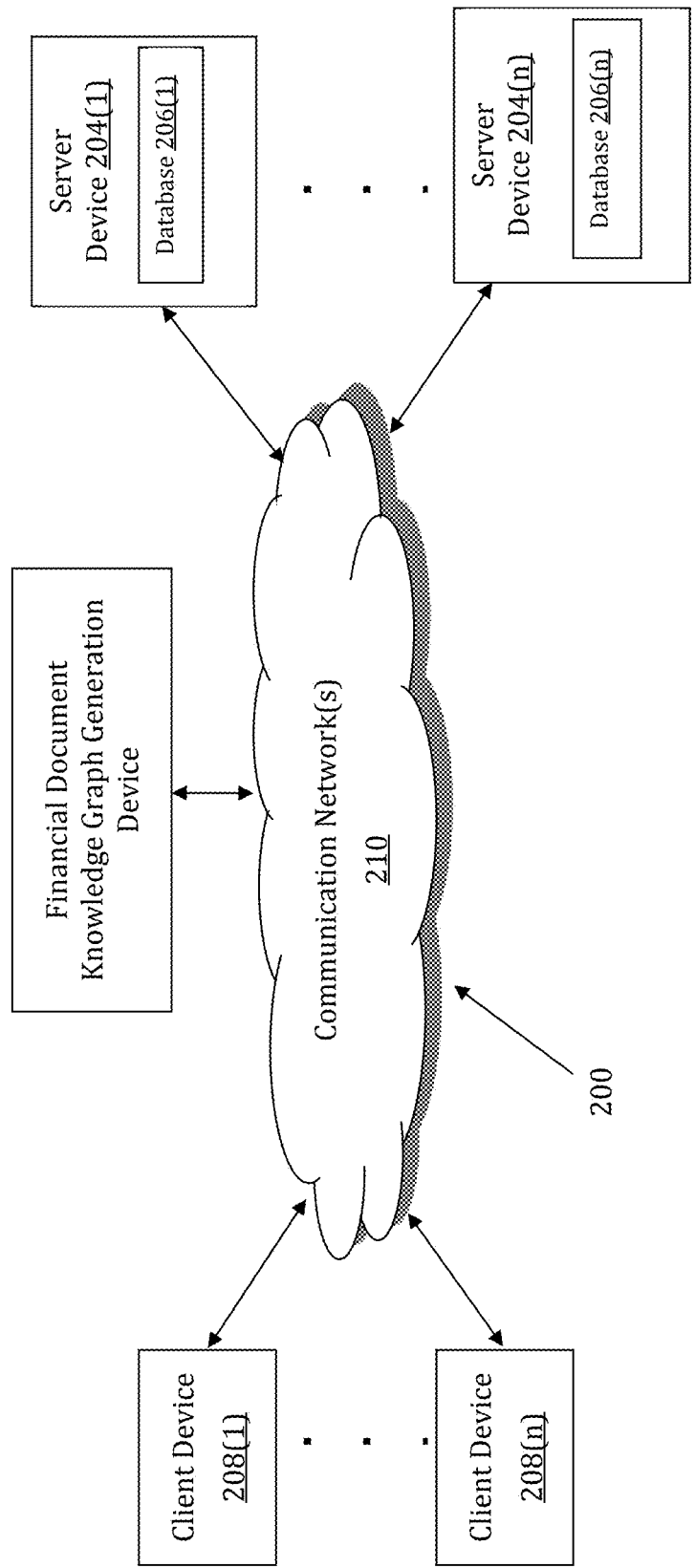
FIG. 2 illustrates an exemplary diagram of a network environment.

Referring to FIG. 2, a schematic of an exemplary network environment 200 for implementing a method for automatically processing financial documents to generate knowledge graphs that convey information relating to entities of interest and relationships between those entities is illustrated. In an exemplary embodiment, the method is executable on any networked computer platform, such as, for example, a personal computer (PC).

The method for automatically processing financial documents to generate knowledge graphs that convey information relating to entities of interest and relationships between those entities may be implemented by a Financial Document Knowledge Graph Generation (FDKGG) device 202. The FDKGG device 202 may be the same or similar to the computer system 102 as described with respect to FIG. 1. The FDKGG device 202 may store one or more applications that can include executable instructions that, when executed by the FDKGG device 202, cause the FDKGG device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the FDKGG device 202 itself, may be located in virtual server(s) running in a cloud-based computing environment rather than being tied to one or more specific physical network computing devices. Also, the application(s) may be running in one or more virtual machines (VMs) executing on the FDKGG device 202. Additionally, in one or more embodiments of this technology, virtual machine(s) running on the FDKGG device 202 may be managed or supervised by a hypervisor.

In the network environment 200 of FIG. 2, the FDKGG device 202 is coupled to a plurality of server devices 204(1)-204(n) that hosts a plurality of databases 206(1)-206(n), and also to a plurality of client devices 208(1)-208(n) via communication network(s) 210. A communication interface of the FDKGG device 202, such as the network interface 114 of the computer system 102 of FIG. 1, operatively couples and communicates between the FDKGG device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the FDKGG device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and FDKGG devices that efficiently implement a method for automatically processing financial documents to generate knowledge graphs that convey information relating to entities of interest and relationships between those entities.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The FDKGG device 202 may be a standalone device or integrated with one or more other devices or apparatuses, such as one or more of the server devices 204(1)-204(n), for example. In one particular example, the FDKGG device 202 may include or be hosted by one of the server devices 204(1)-204(n), and other arrangements are also possible. Moreover, one or more of the devices of the FDKGG device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the FDKGG device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data that relates to financial document types and data that relates to entities of interest.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the FDKGG device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the FDKGG device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the FDKGG device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the FDKGG device 202, the server devices 204(1)-204(n), or the client devices 208(1)-208(n), for example, may be configured to operate as virtual instances on the same physical machine. In other words, one or more of the FDKGG device 202, the server devices 204(1)-204(n), or the client devices 208(1)-208(n) may operate on the same physical device rather than as separate devices communicating through communication network(s) 210. Additionally, there may be more or fewer FDKGG devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
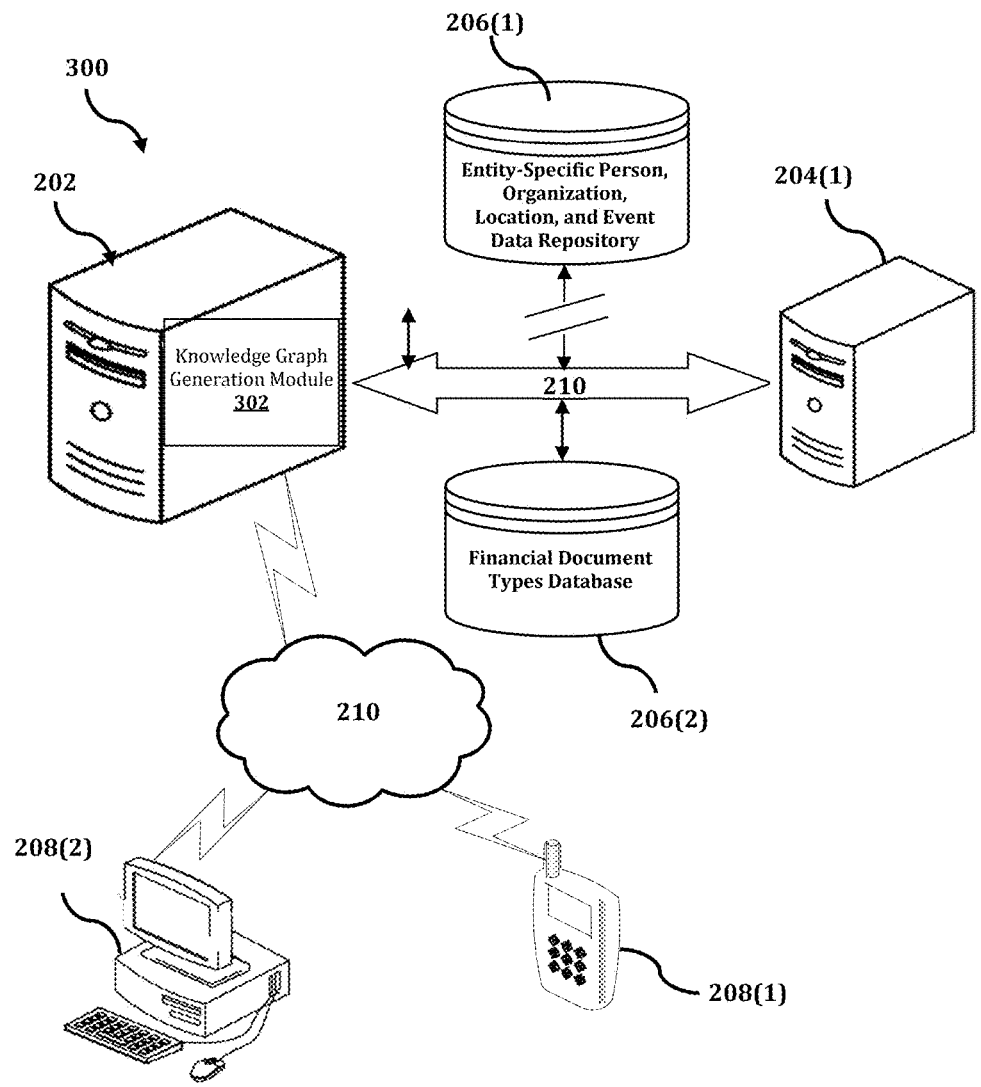
FIG. 3 shows an exemplary system for implementing a method for automatically processing financial documents to generate knowledge graphs that convey information relating to entities of interest and relationships between those entities.

The FDKGG device 202 is described and illustrated in FIG. 3 as including a knowledge graph generation module 302, although it may include other rules, policies, modules, databases, or applications, for example. As will be described below, the knowledge graph generation module 302 is configured to implement a method for automatically processing financial documents to generate knowledge graphs that convey information relating to entities of interest and relationships between those entities.

An exemplary process 300 for implementing a mechanism for automatically processing financial documents to generate knowledge graphs that convey information relating to entities of interest and relationships between those entities s by utilizing the network environment of FIG. 2 is illustrated as being executed in FIG. 3. Specifically, a first client device 208(1) and a second client device 208(2) are illustrated as being in communication with FDKGG device 202. In this regard, the first client device 208(1) and the second client device 208(2) may be "clients" of the FDKGG device 202 and are described herein as such. Nevertheless, it is to be known and understood that the first client device 208(1) and/or the second client device 208(2) need not necessarily be "clients" of the FDKGG device 202, or any entity described in association therewith herein. Any additional or alternative relationship may exist between either or both of the first client device 208(1) and the second client device 208(2) and the FDKGG device 202, or no relationship may exist.

Further, FDKGG device 202 is illustrated as being able to access an entity-specific person, organization, location, and event data repository 206(1) and a financial document types database 206(2). The knowledge graph generation module 302 may be configured to access these databases for implementing a method for automatically processing financial documents to generate knowledge graphs that convey information relating to entities of interest and relationships between those entities.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the FDKGG device 202 via broadband or cellular communication. Of course, these embodiments are merely exemplary and are not limiting or exhaustive.

Upon being started, the knowledge graph generation module 302 executes a process for automatically processing financial documents to generate knowledge graphs that convey information relating to entities of interest and relationships between those entities. An exemplary process for automatically processing financial documents to generate knowledge graphs that convey information relating to entities of interest and relationships between those entities is generally indicated at flowchart 400 in FIG. 4.

Figure 4:
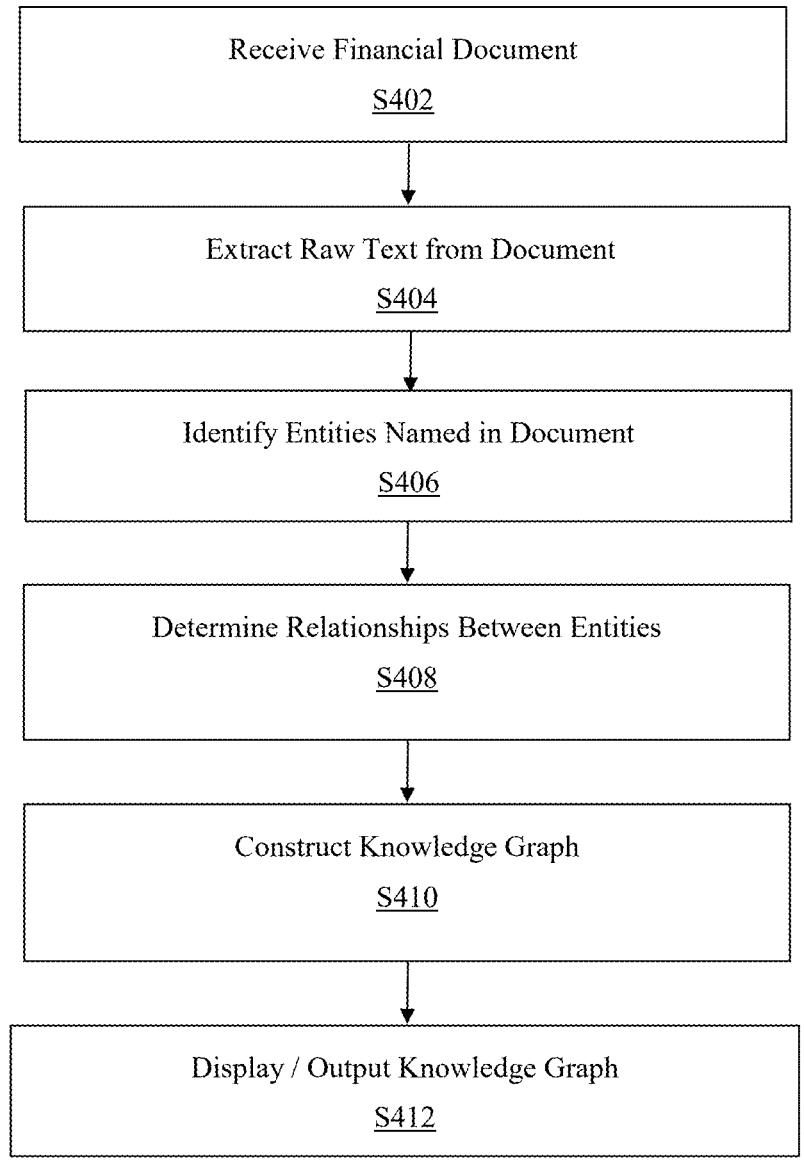
FIG. 4 is a flowchart of an exemplary process for implementing a method for automatically processing financial documents to generate knowledge graphs that convey information relating to entities of interest and relationships between those entities.

In process 400 of FIG. 4, at step S402, the knowledge graph generation module 302 receives a financial document. In an exemplary embodiment, the financial document may include any one or more of a report, a news article, and/or a form, such as, for example, a form that may be prepared and filed for compliance with a governmental regulation.

At step S404, the knowledge graph generation module 302 extracts raw text information from the financial document. In an exemplary embodiment, the document may be in the form of a paper copy, and/or may be in the form of a scanned portable document format (PDF) file or an image PDF file, and as such, the extraction of raw text therefrom may be performed by using a scanner device that is configured to perform an optical character recognition (OCR) operation.

At step S406, the knowledge graph generation module 302 identifies entities that are named in the financial document based on the extracted raw text. The document may contain names of many individual persons or just one person; also, the document may contain a name of a company or commercial organization, such as a corporation, or many such organizations may be named. The document may also include various other types of entities, such as, for example, any one or more of a title (e.g., a job title), a location, an amount, an event, and/or a date. In an exemplary embodiment, the entity identification may be performed by applying a Natural Language Processing (NLP) algorithm that uses a named entity recognition technique to classify the raw text into categories, such as, for example, an individual name category, an organizational name category, a title category, a location category, an amount category, an event category, and a date category. The NLP algorithm may perform the classification by using a library, such as, for example, any one or more of a spaCy library, a CoreNLP library, and a LexNLP library.

At step S408, the knowledge graph generation module 302 determines relationship information that corresponds to pairs of entities that have been identified in step S406. In an exemplary embodiment, the determination of the relationship information is made by applying, to the entities identified in step S406, an artificial intelligence (AI) algorithm that is trained by using historical data that relates to one or more of the identified entities. For example, the historical data may include data that indicates a name of a particular person, a name of an organization that employs the particular person, and a job title that is associated with the particular person, and as a result, when the set of entities identified in step S406 includes these entities, the AI algorithm may determine that these entities all relate to the same person.

At step S410, the knowledge graph generation module 302 uses the entities identified in step S406 and the relationship information determined in step S408 to construct a knowledge graph. In the knowledge graph, the entities identified in step S406 are depicted as nodes, and the relationships between the entities are illustrated by connectors between the nodes and/or edges of the nodes. Then, at step S412, the knowledge graph generation module 302 outputs the knowledge graph. In an exemplary embodiment, the outputting of the knowledge graph may be effected by displaying the knowledge graph via a graphical user interface (GUI) that is displayed at a user terminal.

An understanding of financial documents is extremely useful for various downstream tasks, including, for example, open domain question answering, search and discovery, information extraction, and other tasks that arise within the financial domain. In order to understand financial documents, one method that can be leveraged is building knowledge graphs.

In an exemplary embodiment, a novel end-to-end pipeline that is configured to build financial domain-specific knowledge graphs is provided. Knowledge graphs are graphs of data intended to accumulate and convey knowledge within the documents, whose nodes represent entities of interest (e.g., person, organization, location, event, etc.) and whose edges represent relations between these entities. In order to build these knowledge graphs, the pipeline includes historical data that is gradually accumulated over time and reflect a financial knowledge base, and the pipelines also includes a financial domain-specific entity and relation extractor tool. In an exemplary embodiment, the pipeline generalizes well over other unseen financial documents and can be used to build and infer from other knowledge graphs, hence solving various downstream tasks including, but not limited to, open domain question answering, search and discovery, and information extraction.

Figure 5:
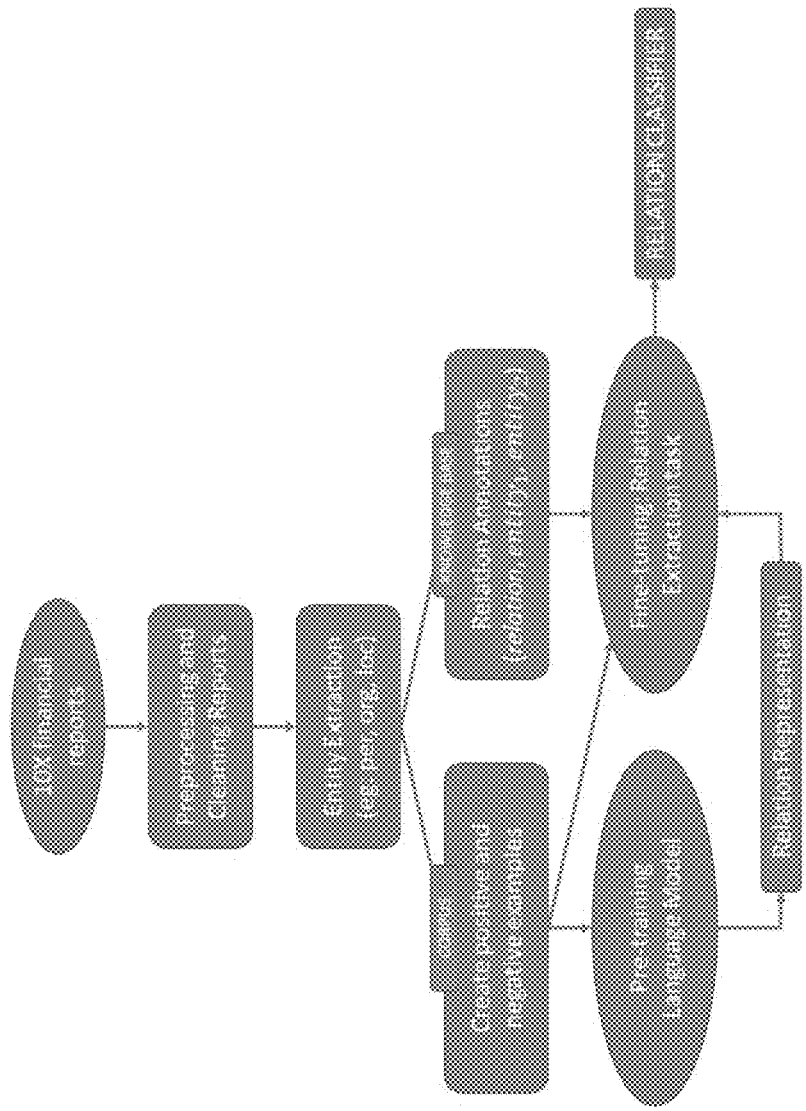
FIG. 5 is a workflow diagram that illustrates a relation extraction operation in a method for automatically processing financial documents to generate knowledge graphs that convey information relating to entities of interest and relationships between those entities, according to an exemplary embodiment.

FIG. 5 is a workflow diagram 500 that illustrates a relation extraction operation in a method for automatically processing financial documents to generate knowledge graphs that convey information relating to entities of interest and relationships between those entities, according to an exemplary embodiment.

In an exemplary embodiment, in order to build and train the pipeline, two types of datasets are required: 1) a corpus of text documents; and 2) a knowledge base containing entities of interest and relations between those entities. In an exemplary embodiment, a set of publicly available 10-K reports that have been filed over a period of 25 years may be used as the corpus. A 10-K report is a comprehensive report that is filed annually by a publicly traded company and includes detailed information about the company's financial performance, such as, for example, history, organizational structure, financial statements, earnings per share, subsidiaries, executive compensation, and other relevant financial data. A prominent source of such reports is the Electronic Data Gathering, Analysis, and Retrieval system (EDGAR) from the U.S. Securities and Exchange (SEC) website that hosts filings of publicly traded companies. In order to maintain transparency and regulate exchanges, the SEC requires all public companies to periodically upload various reports, which describe their financial status and important events like acquisitions and bankruptcy.

In an exemplary embodiment, the knowledge base may be constructed by extracting various entities of interest, including person, title, organization, location, etc., and selecting a set of common financial relations of interest, such as, for example, a set of 12 financial relationship types. In an exemplary embodiment, the financial knowledge base may also include annotations of various sentences with these entities and relations.

In an exemplary embodiment, the novel pipeline breaks the problem into two sequential steps. In the first step, nodes of the knowledge graph are identified by extracting entities of interest from a document. This may be accomplished by using a technique known as Named Entity Recognition, which locates named entities included in text and classifies the entities into predefined categories, such as names of persons, organizations, locations, amounts, dates, etc. In an exemplary embodiment, pre-trained libraries such as the spaCy library, the CoreNLP library, and the LexNLP library may be used to identify token spans in the text and classify the identified token spans into predefined labels. In an exemplary embodiment, entity markers may be placed around the entities for each sentence occurring in a particular text.

Table 1 illustrates an example of how six (6) entities of interest may be extracted from a report:

| # | Entities | Method |
|---|---|---|
| 1-5 | PERSON, ORGANIZATION, DATE, LOCATION, MONEY | Named entities may be extracted using the spaCy library, wherein the Named Entity Recognition system within spaCy features a sophisticated word embedding strategy using sub-word features and bloom embeddings, a deep convolutional neural network with residual connections, and a novel transition-based approach to named entity parsing. |
| 6 | TITLE | "Title" as an entity may be extracted using the CoreNLP library, wherein the Named Entity Recognition (NER) system within CoreNLP applies a series of rules to create more fine-grained NER tags. |

In the second step, a novel relation extractor which combines the distant supervision paradigm with entity type restricted relation classifier is provided. This step involves two sub-steps. In the first step, a Bidirectional Encoder Representations from Transformers (BERT) model is trained to learn contextual representation surrounding the entities of interest. Due to the scarcity of labeled examples, this sub-step leverages the Distant Supervision hypothesis, which suggests that two entities participate in a relation, any sentence that contain those two entities is most likely to express that relation. This hypothesis may also be used to discover new relation instances that do not currently appear in the financial knowledge base, hence extending an existing financial knowledge base. In order to leverage this paradigm, positive and negative examples are generated. The positive examples include the two entities of interest and the correct relation between them. The negative examples include entity pairs which do not belong to any known relation and entity pairs for which one entity co-occurs with some unknown entity.

It has been observed that the Distant Supervision paradigm is a strict hypothesis which may misplace some similar cases into the negative sample category incorrectly. For example, the following is a positive example: "Elon Musk is the founder of Tesla" with entity 1 as "Elon Musk" and entity 2 as "Tesla," the relation is "founder of." In a second example: "Elon Musk is the founder of SpaceX," with entity 1 as "Elon Musk" and entity 2 as "SpaceX," although the relation is again "founder of," because this represents a different co-occurring entity, the Distant Supervision hypothesis incorrectly places the second example as a negative example. Hence, in order to relax the Distant Supervision paradigm, the concept of Shortest Dependency Path (SDP) may be leveraged. The SDP concept is built on the hypothesis that the SDP between entities usually contains the necessary information to identify their relationship. The shortest dependency path between the two entities is leveraged for the positive example and the next occurring example, and the similarity between the two is determined. If the similarity between the positive example and the next occurring example is very high, then the SDP method may be prioritized in order to place the second example into the positive example category rather than the negative example category.

Figure 6:
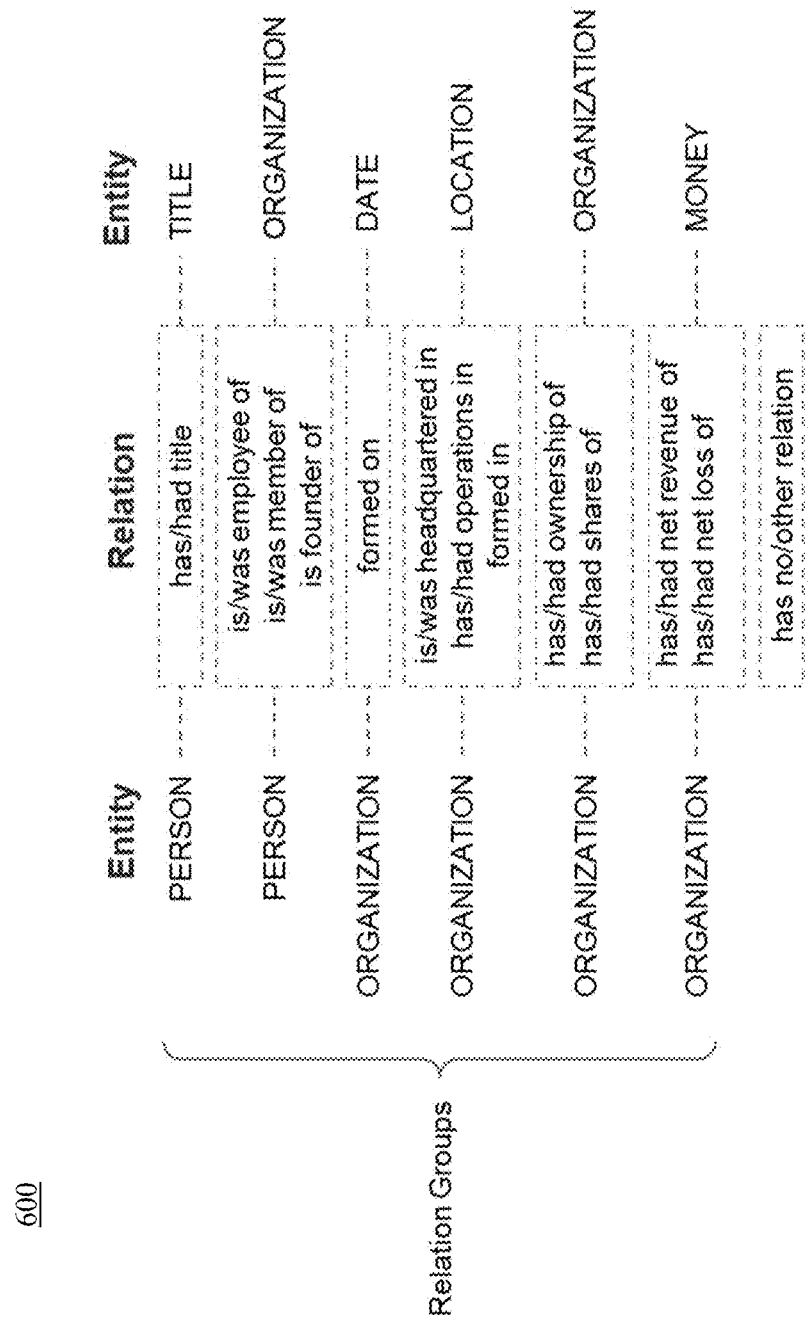
FIG. 6 is an example of relations and entities of interest that are generated as a result of executing a method for automatically processing financial documents to generate knowledge graphs that convey information relating to entities of interest and relationships between those entities, according to an exemplary embodiment.

FIG. 6 is an example 600 of relations and entities of interest in a financial knowledge based that is generated as a result of executing a method for automatically processing financial documents to generate knowledge graphs that convey information relating to entities of interest and relationships between those entities, according to an exemplary embodiment.

In the second sub-step, the financial knowledge base is used to fine-tune the model in a manner that is specific to the task of relation extraction. Unlike conventional methods that classify a sentence and its entities on all candidate relations, in order to fine tune the model, for each training example, the concept of training a specific relation classifier with precise relations which can occur between the two entity types is leveraged. In an exemplary embodiment, this technique facilitates a more precise capture of a semantic relationship between two entities of interest.

Figure 7:
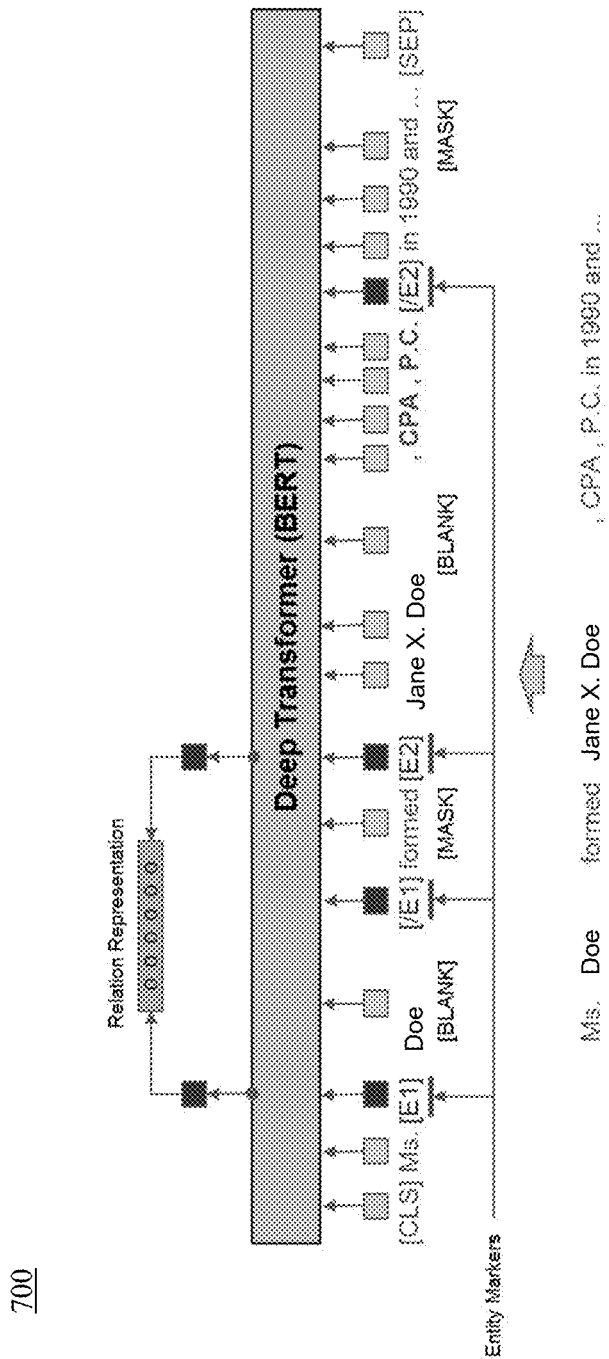
FIG. 7 is an illustration of a pre-training language model that is usable in a method for automatically processing financial documents to generate knowledge graphs that convey information relating to entities of interest and relationships between those entities, according to an exemplary embodiment.

FIG. 7 is an illustration 700 of a pre-training language model that is usable in a method for automatically processing financial documents to generate knowledge graphs that convey information relating to entities of interest and relationships between those entities, according to an exemplary embodiment.

In order to learn domain-specific (financial) contextual relation representation surrounding the entities of interest. In an exemplary embodiment, the BERT model is pre-trained by using over twenty (20) years of examples of 10-K reports. As shown in illustration 700, the relation between two entities may be represented with the concatenation of the final hidden states corresponding to their respective start tokens [E1] and [E2]. Moreover, in order to avoid the BERT model possibly learning the contextual representation specifically dependent on the particular entities, the concept of masking the entities with a certain probability where one or both of the entity instances is replaced with a [BLANK] symbol.

Finally, in order to learn better relation representation, the concept of contrastive pre-training is also utilized. The main idea of contrastive learning is to learn representations such that similar samples stay close to each other, while dissimilar ones are far apart. In an exemplary embodiment, the loss function for contrastive learning may be expressed as follows:

$$\mathcal{L}_{CP} = -\log \frac{\exp(\text{sim}(z_i, z_j)/\tau)}{\sum_{k=1}^{2N} \mathbb{1}_{[k \neq i]} \exp(\text{sim}(z_i, z_k)/\tau)}$$

Hence, the two headed loss function may be minimized to pre-train the BERT model:

Training Loss: $L = L_{MLM_{SDP}} + L_{CP}$

Figure 8:
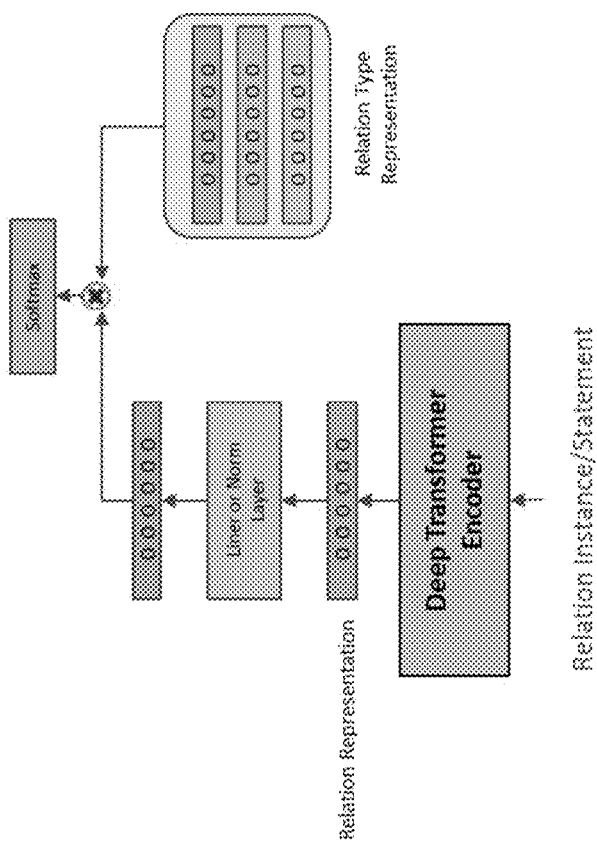
FIG. 8 is an illustration of a fine-tuning for relation extraction operation in a method for automatically processing financial documents to generate knowledge graphs that convey information relating to entities of interest and relationships between those entities, according to an exemplary embodiment.

In the second sub-step, the financial knowledge base is used to fine-tune the model in a manner that is specific to the task of relation extraction. Unlike conventional methods that classify a sentence and its entities on all candidate relations, in order to fine tune the model, for each training example, the concept of training a specific relation classifier with precise relations which can occur between the two entity types is leveraged. In an exemplary embodiment, this technique facilitates a more precise capture of a semantic relationship between two entities of interest. FIG. 8 is an illustration 800 of a fine-tuning for relation extraction operation in a method for automatically processing financial documents to generate knowledge graphs that convey information relating to entities of interest and relationships between those entities, according to an exemplary embodiment.

Figure 9:
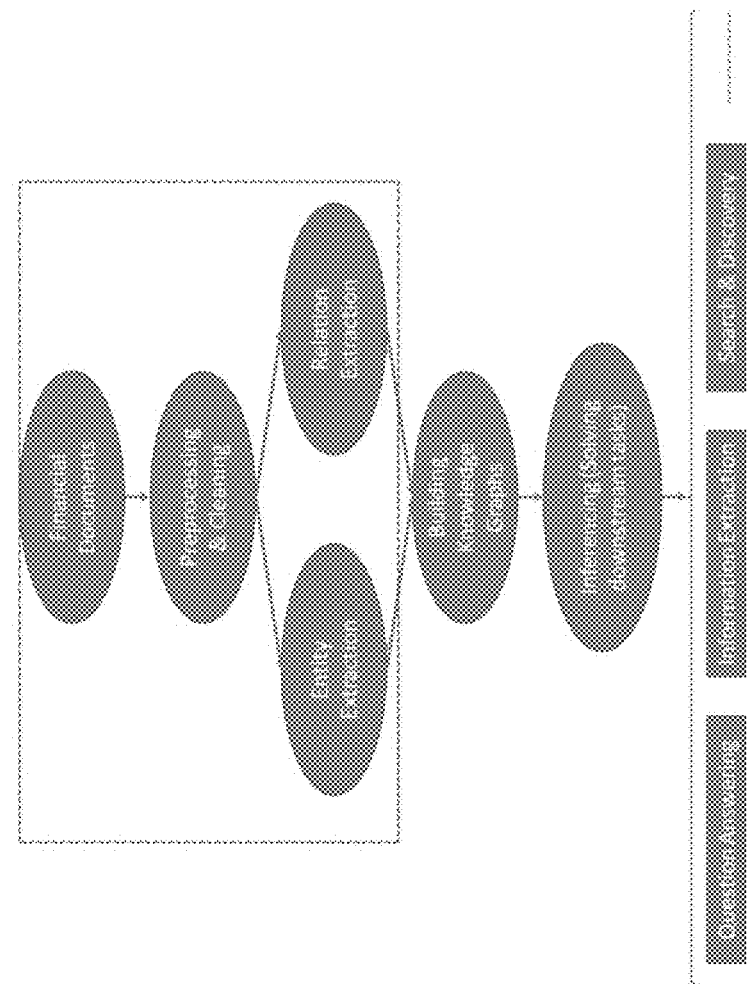
FIG. 9 is an illustration of a system architecture for a data flow pipeline in a system for automatically processing financial documents to generate knowledge graphs that convey information relating to entities of interest and relationships between those entities, according to an exemplary embodiment.

FIG. 9 is an illustration 900 of a system architecture for a data flow pipeline in a system for automatically processing financial documents to generate knowledge graphs that convey information relating to entities of interest and relationships between those entities, according to an exemplary embodiment. As shown in illustration 900, the algorithm reads a large volume of financial documents, preprocesses the documents, and extracts entities of interest and relations between those entities. Once the entities and relations between those entities are obtained, knowledge graphs are built using the entities as nodes and relation between those entities as edges. This is then used for inferencing and solving various downstream tasks, such as open domain question answering, information extraction, and search and discovery.

Figure 10:
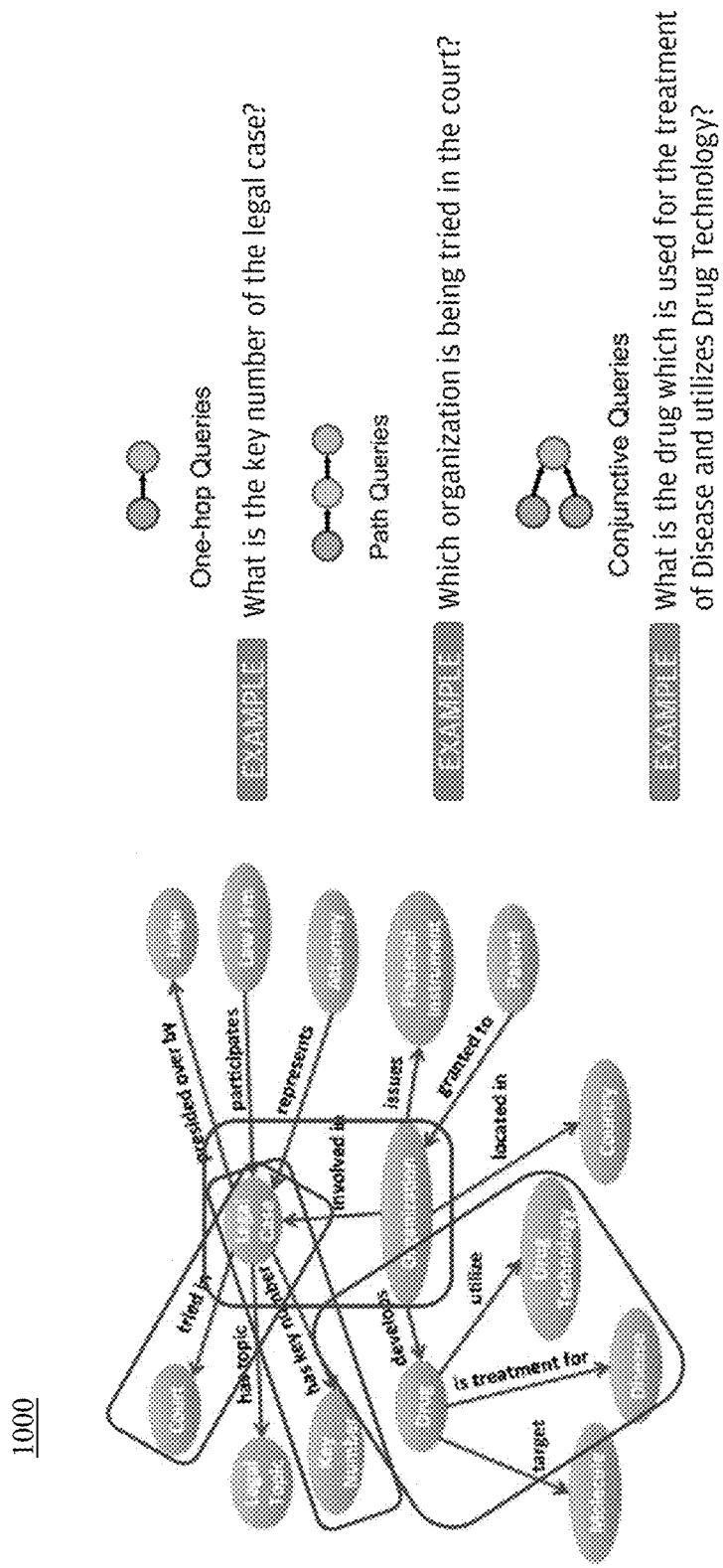
FIG. 10 is an example of a knowledge graph that is generated as a result of executing a method for automatically processing financial documents to generate knowledge graphs that convey information relating to entities of interest and relationships between those entities, according to an exemplary embodiment.

FIG. 10 is an example of a knowledge graph 1000 that is generated as a result of executing a method for automatically processing financial documents to generate knowledge graphs that convey information relating to entities of interest and relationships between those entities, according to an exemplary embodiment. As shown in knowledge graph 1000, an example of downstream task, open-domain question answering, may include one-hop queries, path queries, and conjunctive queries.

Accordingly, with this technology, an optimized process for automatically processing financial documents to generate knowledge graphs that convey information relating to entities of interest and relationships between those entities is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims, and their equivalents, and shall not be restricted or limited by the foregoing detailed description.

What is claimed is:

1. A method for characterizing information contained in a financial document, the method being implemented by at least one processor, the method comprising:
   receiving, by the at least one processor, a document;
   extracting, by the at least one processor, raw text included in the document;
   identifying, by the at least one processor based on the extracted raw text, a plurality of entities that are named in the document;
   determining, by the at least one processor based on the extracted raw text, respective relationship information that corresponds to at least one pair of entities from among the plurality of entities by applying a Bidirectional Encoder Representations from Transformers (BERT) model that is trained to learn contextual representation surrounding the plurality of entities and that uses a distance supervision paradigm and an entity type restricted relation classifier to determine the respective relationship information by:
      identifying a first entity pair from among two entities of the plurality of entities that are a positive example;
      calculating a first shortest dependency path between the two entities of the first entity pair;
      identifying a second entity pair from among two entities of the plurality of entities;
      calculating a second shortest dependency path between the two entities of the second entity pair;
      determining a similarity between the first shortest dependency path and the second shortest dependency path; and
      determining, based on the determined similarity, whether the second entity pair is in a positive example category or a negative example category; and
   outputting, by the at least one processor, a subset of the determined respective relationship information.

2. The method of claim 1, further comprising constructing, by the least one processor based on the determined respective relationship information, a knowledge graph that illustrates domain-specific respective relationships among each of the at least one pair of entities by applying the BERT model to generate the domain-specific respective relationships based on the trained learning of the contextual representation surrounding the plurality of entities.

3. The method of claim 2, further comprising displaying, via a graphical user interface (GUI), the constructed knowledge graph.

4. The method of claim 1, wherein the plurality of entities includes at least one from among a name of a person, a name of an organization, a title, a location, an amount, an event, and a date.

5. The method of claim 1, wherein the determining of the respective relationship information further comprises pre-training the BERT model with a plurality of financial documents.

6. The method of claim 1, wherein the identifying of the plurality of entities is performed by applying a Natural Language Processing (NLP) algorithm that uses a named entity recognition technique to classify the extracted raw text into at least one from among a plurality of predetermined categories.

7. The method of claim 6, wherein the NLP algorithm classifies the extracted raw text by using at least one from among a spaCy library, a CoreNLP library, and a LexNLP library.

8. A computing apparatus for characterizing information contained in a financial document, the computing apparatus comprising:
   a processor;
   a memory;
   a display; and
   a communication interface coupled to each of the processor, the memory, and the display,
   wherein the processor is configured to:
      receive, via the communication interface, a document;
      extract raw text included in the document;
      identify, based on the extracted raw text, a plurality of entities that are named in the document;
      determine, based on the extracted raw text, respective relationship information that corresponds to at least one pair of entities from among the plurality of entities by applying a Bidirectional Encoder Representations from Transformers (BERT) model that is trained to learn contextual representation surrounding the plurality of entities and that uses a distance supervision paradigm and an entity type restricted relation classifier to determine the respective relationship information by:
         identifying a first entity pair from among two entities of the plurality of entities that are a positive example;
         calculating a first shortest dependency path between the two entities of the first entity pair;

identifying a second entity pair from among two entities of the plurality of entities;

calculating a second shortest dependency path between the two entities of the second entity pair;

determining a similarity between the first shortest dependency path and the second shortest dependency path; and determining, based on the determined similarity, whether the second entity pair is in a positive example category or a negative example category; and output a subset of the determined respective relationship information.

9. The computing apparatus of claim 8, wherein the processor is further configured to construct, based on the determined respective relationship information, a knowledge graph that illustrates domain-specific respective relationships among each of the at least one pair of entities by applying the BERT model to generate the domain-specific respective relationships based on the trained learning of the contextual representation surrounding the plurality of entities.

10. The computing apparatus of claim 9, wherein the processor is further configured to cause the display to display, via a graphical user interface (GUI), the constructed knowledge graph.

11. The computing apparatus of claim 8, wherein the plurality of entities includes at least one from among a name of a person, a name of an organization, a title, a location, an amount, an event, and a date.

12. The computing apparatus of claim 8, wherein the processor is further configured to determine the respective relationship information by pre-training the BERT model with a plurality of financial documents.

13. The computing apparatus of claim 8, wherein the processor is further configured to perform the identifying of the plurality of entities by applying a Natural Language Processing (NLP) algorithm that uses a named entity recognition technique to classify the extracted raw text into at least one from among a plurality of predetermined categories.

14. The computing apparatus of claim 13, wherein the NLP algorithm classifies the extracted raw text by using at least one from among a spaCy library, a CoreNLP library, and a LexNLP library.

15. A non-transitory computer readable storage medium storing instructions for characterizing information contained in a financial document, the storage medium comprising executable code which, when executed by a processor, causes the processor to:

receive a document;

extract raw text included in the document;

identify, based on the extracted raw text, a plurality of entities that are named in the document;

determine, based on the extracted raw text, respective relationship information that corresponds to at least one pair of entities from among the plurality of entities by applying a Bidirectional Encoder Representations from Transformers (BERT) model that is trained to learn contextual representation surrounding the plurality of entities and that uses a distance supervision paradigm and an entity type restricted relation classifier to determine the respective relationship information by:

identifying a first entity pair from among two entities of the plurality of entities that are a positive example;

calculating a first shortest dependency path between the two entities of the first entity pair;

identifying a second entity pair from among two entities of the plurality of entities;

calculating a second shortest dependency path between the two entities of the second entity pair;

determining a similarity between the first shortest dependency path and the second shortest dependency path; and determining, based on the determined similarity, whether the second entity pair is in a positive example category or a negative example category; and output a subset of the determined respective relationship information.

16. The storage medium of claim 15, wherein the executable code is further configured to cause the processor to construct, based on the determined respective relationship information, a knowledge graph that illustrates domain-specific respective relationships among each of the at least one pair of entities by applying the BERT model to generate the domain-specific respective relationships based on the trained learning of contextual representation surrounding the plurality of entities.

17. The storage medium of claim 16, wherein the executable code is further configured to cause the processor to display, via a graphical user interface (GUI), the constructed knowledge graph.

18. The storage medium of claim 15, wherein the plurality of entities includes at least one from among a name of a person, a name of an organization, a title, a location, an amount, an event, and a date.

19. The storage medium of claim 15, wherein the executable code is further configured to cause the processor to determine the respective relationship information by pre-training the BERT model with a plurality of financial documents.

20. The storage medium of claim 15, wherein the executable code is further configured to cause the processor to perform the identifying of the plurality of entities applying a Natural Language Processing (NLP) algorithm that uses a named entity recognition technique to classify the extracted raw text into at least one from among a plurality of predetermined categories.

* * * * *